(12) United States Patent
Kim

(10) Patent No.: US 10,708,540 B2
(45) Date of Patent: Jul. 7, 2020

(54) VIDEO MANAGEMENT SYSTEM AND VIDEO MANAGEMENT METHOD

(71) Applicant: HANWHA TECHWIN CO., LTD., Seongnam-si (KR)

(72) Inventor: Han Sang Kim, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 15/795,599

(22) Filed: Oct. 27, 2017

(65) Prior Publication Data

US 2018/0213182 A1 Jul. 26, 2018

(30) Foreign Application Priority Data

Jan. 20, 2017 (KR) ........................ 10-2017-0009928

(51) Int. Cl.
| | | |
|---|---|---|
| *H04N 7/01* | (2006.01) | |
| *G11B 27/10* | (2006.01) | |
| *H04N 21/2743* | (2011.01) | |
| *H04N 5/77* | (2006.01) | |
| *H04N 21/235* | (2011.01) | |

(Continued)

(52) U.S. Cl.
CPC ........... *H04N 7/0117* (2013.01); *G11B 27/10* (2013.01); *H04N 5/77* (2013.01); *H04N 5/91* (2013.01); *H04N 7/183* (2013.01); *H04N 9/8205* (2013.01); *H04N 21/2353* (2013.01); *H04N 21/23439* (2013.01);
(Continued)

(58) Field of Classification Search
CPC .............................. G11B 27/10; H04N 7/0117
See application file for complete search history.

(56) References Cited

U.S. PATENT DOCUMENTS 6,456,321 B1 * 9/2002 Ito ............................ G06T 9/00
348/143
9,124,783 B2 9/2015 Maslan
(Continued)

FOREIGN PATENT DOCUMENTS

KR          10-1178886 B1    9/2012
KR    10-2014-0021097 A     2/2014
(Continued)

OTHER PUBLICATIONS

Andrej Karpathy, et al., "Large-scale Video Classification with Convolutional Neural Networks", Computer Science Department, Stanford University, 2014, total 20 pages.

*Primary Examiner* — Girumsew Wendmagegn
(74) *Attorney, Agent, or Firm* — Sughrue Mion, PLLC

(57) ABSTRACT

A video management system includes: an imaging device configured to generate a first image by capturing a surveillance area at a first resolution; and a video management server configured to store a second image by converting the first image, wherein the imaging device includes: a high-resolution image storage configured to store the first image; a processor configured to convert the first image into the second image having a second resolution that is lower than the first resolution; and to transmit the second image to the video management server, and the video management server includes: a low-resolution image storage configured to store the second image; and a processor configured to generate low-resolution image metadata and an index of the low-resolution image metadata by analyzing the second image.

19 Claims, 6 Drawing Sheets

(51) Int. Cl.
*H04N 21/4223* (2011.01)
*H04N 21/2343* (2011.01)
*H04N 5/91* (2006.01)
*H04N 7/18* (2006.01)
*H04N 9/82* (2006.01)
*H04N 21/84* (2011.01)

(52) U.S. Cl.
CPC . *H04N 21/234363* (2013.01); *H04N 21/2743* (2013.01); *H04N 21/4223* (2013.01); *H04N 21/84* (2013.01)

(56) References Cited

U.S. PATENT DOCUMENTS

2011/0310263 A1   12/2011   Pien
2015/0269143 A1*  9/2015    Park .................... G06F 17/301
                                                 382/305

FOREIGN PATENT DOCUMENTS

| KR | 10-1420006 B1 | 7/2014 |
| KR | 10-1634242 B1 | 6/2016 |

* cited by examiner

VIDEO MANAGEMENT SYSTEM AND VIDEO MANAGEMENT METHOD

CROSS-REFERENCE TO THE RELATED APPLICATION

This application claims priority from Korean Patent Application No. 10-2017-0009928, filed on Jan. 20, 2017, in the Korean Intellectual Property Office, the disclosure of which is incorporated herein in its entirety by reference.

BACKGROUND

1. Field

Exemplary embodiments relate to a video management system and a video management method.

2. Description of the Related Art

Video management systems for imaging a surveillance area and storing/analyzing an obtained image are used for information acquisition or surveillance. Such video management systems may capture an image, store the image, analyze the image, and provide information about the image requested by a user. To this end, video management systems may include an imaging device for capturing an image and a video management server for storing and analyzing the captured image.

Recently, an imaging device capable of obtaining a high-resolution image has been generally used in a video management system. However, as a resolution of an image handled by the video management system has increased, the amount of data to be stored and/or processed has increased, thereby causing issues such as increase in cost and less efficient transmission of image data.

If a video management server performs image analysis, a high-resolution image captured by an imaging device needs to be transmitted to the video management server. In this case, the amount of data needed to transmit the high-resolution image rapidly increases, thereby significantly increasing an inbound cost of the video management server.

If an imaging device performs image analysis, the cost of the imaging device may increase because complex intelligent image analysis may need to be performed.

SUMMARY

Exemplary embodiments include a video management system and a video management method that may allow an imaging device to capture a high-resolution image, and simultaneously store the high-resolution image and transmit a low-resolution image, converted from the high-resolution image, to a video management server.

Exemplary embodiments include a video management system and a video management method that may allow a video management server to analyze a low-resolution image, provide the low-resolution image and an analysis result according to a request of an external user, and when receiving a request to provide information related to a high-resolution image from the external user, provide the information through an imaging device.

Additional aspects will be set forth in part in the description which follows and, in part, will be apparent from the description, or may be learned by practice of the exemplary embodiments.

According to an exemplary embodiment, there is provided a video management system including: an imaging device configured to generate a first image by capturing a surveillance area at a first resolution; and a video management server configured to store a second image obtained by converting the first image, wherein the imaging device includes: a high-resolution image storage configured to store the first image; a processor configured to: convert the first image into the second image having a second resolution that is lower than the first resolution; and transmit the second image to the video management server, and wherein the video management server includes: a low-resolution image storage configured to store the second image; and a processor configured to generate a low-resolution image metadata and an index of the low-resolution image metadata by analyzing the second image.

The processor of the video management server may be further configured to receive, from an external device, an information request signal.

The processor of the video management server may be further configured to determine whether information corresponding to the information request signal is included in the second image; and provide, to the external device, information including at least one from among the second image, a portion of the second image, the low-resolution image metadata, and the index of the low-resolution image metadata when it is determined that the information corresponding to the information request signal is included in the second image.

The processor of the video management server may be further configured to determine whether the information corresponding to the information request signal is included in the first image when it is determined that the information corresponding to the information request signal is not included in the second image.

The video management server may be further configured to transmit, to the imaging device, a transmission signal to provide information including at least one from among the first image, a portion of the first image, and information corresponding to the first image to the external device when it is determined that the information corresponding to the information request signal is included in the first image.

The imaging device may be further configured to transmit information corresponding to the transmission signal to the external device in response to receiving the transmission signal.

The imaging device may be further configured to generate high-resolution image metadata and an index of the high-resolution image metadata by analyzing the first image.

The imaging device may be further configured to transmit, to the video management server, at least a part of the high-resolution image metadata and at least a part of the index of the high-resolution image metadata, and the video management server may be further configured to store the at least part of the high-resolution image metadata and the at least part of the index of the high-resolution image metadata.

The processor of the imaging device may be further configured to generate the low-resolution image metadata including only metadata not included in the high-resolution image metadata, from among metadata corresponding to the second image.

The processor of the imaging device may be further configured to generate the high-resolution image metadata including only metadata corresponding to information that is included in the first image and is not included in the second image, from among metadata corresponding to the first image.

The imaging device may be further configured to store only high-resolution image metadata corresponding to information that is included in the first image and is not included in the second image, from among the high-resolution image metadata.

The video management server may be further configured to transmit, to the imaging device, at least a part of the low-resolution image metadata and at least a part of the index of the low-resolution image metadata, and the imaging device may be further configured to store the at least part of the low-resolution image metadata and the at least part of the index of the low-resolution image metadata.

The processor of the imaging device may be further configured to classify the first image into a transmission-required image required to be transmitted to the video management server and a transmission-unrequired image not required to be transmitted to the video management server corresponding to the first image, and the processor of the imaging device may be further configured to generate the second image by converting the transmission-required image.

The imaging device may perform a first process for storing the first image in the high-resolution image storage; and a second process for converting the first image into the second image and transmitting the second image to the video management server by the processor of the imaging device, wherein the first process and the second process may at least partially overlap each other.

The processor of the imaging device may be further configured to obtain the second image by converting the first resolution of the first image into the second resolution that is lower than the first resolution, and by removing a sound component from the first image.

According to another exemplary embodiment, there is provided a video management method of managing a captured image by using a video management system including an imaging device and a video management server, the video management method including: generating, by the imaging device, a first image by capturing a surveillance area at a first resolution; storing, by the imaging device, the first image; converting, by the imaging device, the first image into a second image having a second resolution that is lower than the first resolution; transmitting, by the imaging device, the second image to the video management server; storing, by the video management server, the second image; and generating, by the video management server, low-resolution image metadata and an index of the low-resolution image metadata by analyzing the second image.

The video management method may further include receiving, by the video management server from an external device, a request to provide information.

The video management method may further include: determining, by the video management server, whether information corresponding to the request is included in the second image; determining, by the video management server, whether the information corresponding to the request is included in the first image when it is determined that the information corresponding to the request is not included in the second image; and transmitting, by the video management server to the imaging device, a transmission signal requesting the imaging device to provide information corresponding to the request to the external device.

The video management method may further include: transmitting, by the video management server, the information corresponding to the request to the external device when it is determined that the information corresponding to the request is included in the second image; and transmitting, by the imaging device, the information corresponding to the request to the external device in response to receiving the transmission signal.

According to another exemplary embodiment, there is provided a video management system including: an imaging device configured to generate a first image by capturing a surveillance area at a first resolution; and a video management server configured to store a second image obtained by converting the first image, wherein the imaging device includes: a high-resolution image storage configured to store the first image; a processor configure to: convert the first image into the second image having a second resolution that is lower than the first resolution; and transmit the second image to the video management server, and wherein the video management server includes: a low-resolution image storage configured to store the second image; a processor configured to: receive, from an external device, a request to provide information corresponding to the second image; determine whether information corresponding to the request is included in the second image, and when the information corresponding to the request is not included in the second image, to transmit, to the imaging device, a transmission signal requesting the imaging device to provide the information corresponding to the request to the external device; and provide the information corresponding to the request to the external device when the information corresponding to the request is included in the second image, wherein the imaging device is further configured to, in response to receiving the transmission signal, transmit information corresponding to the transmission signal to the external device.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION

Figure 1:
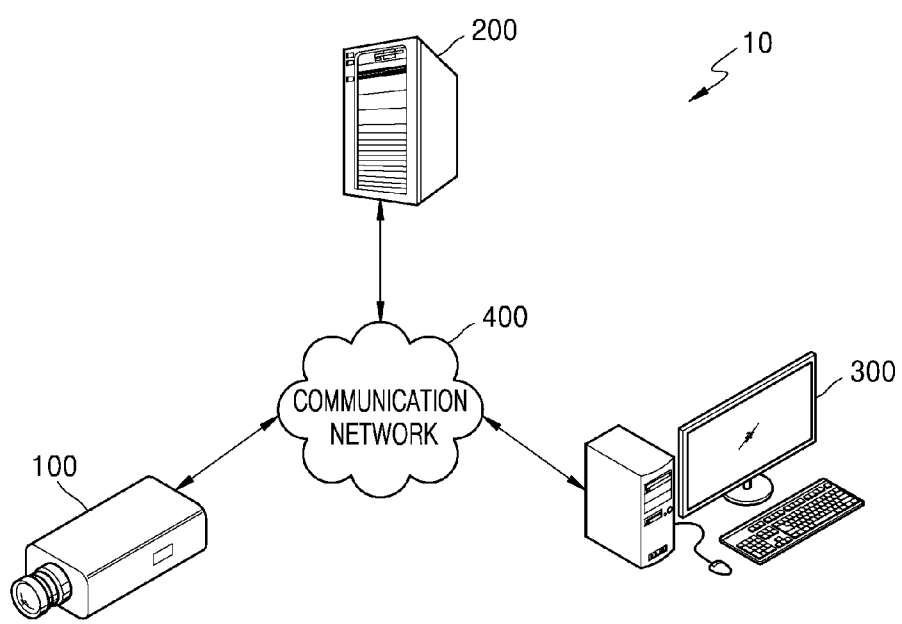
FIG. 1 is illustrates a configuration of a video management system according to an exemplary embodiment.

Hereinafter, exemplary embodiments will be described in detail with reference to the accompanying drawings. These exemplary embodiments are described in sufficient detail to enable those skilled in the art to practice the inventive concept, and it is to be understood that the exemplary embodiments are not intended to limit the present disclosure to particular modes of practice, and it is to be appreciated that all modification, equivalents, and alternatives that do not depart from the spirit and technical scope of the present disclosure are encompassed in the present disclosure.

The terms used herein are used for the purpose of describing the exemplary embodiments, and not for the purpose of limiting and/or restricting the present disclosure.

It will be understood that although the terms "first", "second", etc. may be used herein to describe various elements, these elements should not be limited by these terms. These elements are only used to distinguish one element from another. As used herein, the singular forms "a", "an", and "the" are intended to include both the singular and plural forms, unless the context clearly indicates otherwise. It will be further understood that the terms "comprises" and/or "comprising" used herein specify the presence of stated features or components, but do not preclude the presence or addition of one or more other features or components. Sizes of elements may be exaggerated for convenience of explanation. In other words, since sizes and thicknesses of elements in the drawings are arbitrarily illustrated for convenience of explanation, the following embodiments are not limited thereto.

The recitation of ranges of values herein are merely intended to serve as a shorthand method of referring individually to each separate value falling within the ranges, unless otherwise indicated herein, and each separate value is incorporated into the specification as if it were individually recited herein.

Also, the operations of all methods described herein may be performed in any suitable order unless otherwise indicated herein or otherwise clearly contradicted by context. The present disclosure is not limited to the described order of the operations. The use of any and all examples, or exemplary language (e.g., "such as") provided herein, is intended merely to better explain the present disclosure and does not pose a limitation on the scope of the present disclosure unless otherwise claimed.

Hereinafter, the present disclosure will be described in detail by explaining exemplary embodiments with reference to the accompanying drawings. Like elements in the drawings are denoted by like reference numerals, and thus a repeated explanation thereof will not be given.

FIG. 1 is illustrates a configuration of a video management system 10 according to an exemplary embodiment.

Referring to FIG. 1, the video management system 10 according to an exemplary embodiment may include an imaging device 100 and a video management server 200.

The imaging device 100 may be an electronic imaging device located at a fixed position of a specific location, an electronic imaging device that may automatically or manually move along a predetermined path, or an electronic imaging device that may be moved by a person, a robot, or the like. The imaging device 100 may be an Internet protocol (IP) camera that is used by being connected to the Internet by wire/wirelessly. The imaging device 100 may be a pan-tilt-zoom (PTZ) camera that may pan, tilt, and zoom. The imaging device 100 may record a surveillance area or capture an image of the surveillance area. The imaging device 100 may record a sound produced in the surveillance area. When a change such as a movement or a sound occurs in the surveillance area, the imaging device 100 may generate a notification, may record the change, and/or may capture an image.

The video management server 200 may be configured to receive and store an image captured by the imaging device 100 and/or an image obtained by editing the image captured by the imaging device 100. The video management server 200 may generate metadata and index information about the metadata by analyzing the received image. The video management server 200 may generate the metadata and the index information about the metadata by analyzing image information and/or sound information included in the received image together or separately.

The video management system 10 may further include an external device 300 that may perform wired/wireless communication with the imaging device 100 and/or the video management server 200.

The external device 300 may transmit an information request signal requesting the video management server 200 to provide an entire image or a part of an image captured by the imaging device 100. The external device 300 may transmit an information request signal requesting the video management server 200 to provide metadata and/or index information about the metadata obtained by analyzing the image transmitted from the video management server 200.

The video management system 10 may further include a communication network 400 that is a wired/wireless communication path between the imaging device 100, the video management server 200, and/or the external device 300. The communication network 400 may be, but is not limited to, a wired network such as a local area network (LAN), a wide area network (WAN), a metropolitan area network (MAN), or an integrated service digital network (ISDN) or a wireless network such as a wireless LAN, code-division multiple access (CDMA), Bluetooth, or satellite communication.

Figure 2:
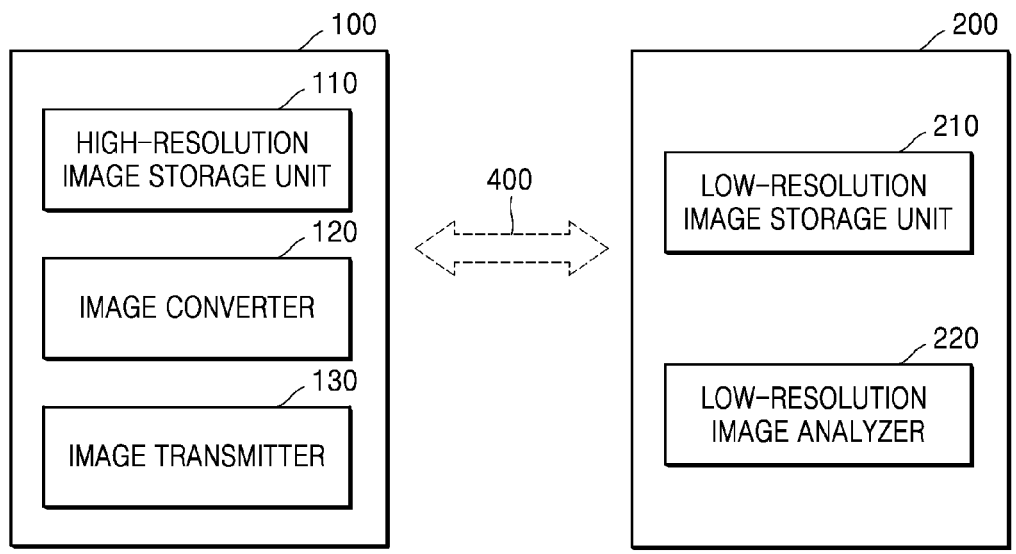
FIG. 2 is a block diagram illustrating a configuration of the video management system according to an exemplary embodiment.

FIG. 2 is a block diagram illustrating a configuration of the video management system 10 according to an exemplary embodiment.

Referring to FIG. 2, the video management system 10 according to an exemplary embodiment may include the imaging device 100 and the video management server 200. In this case, the imaging device 100 may include a high-resolution image storage unit 110, an image converter 120, and an image transmitter 130. The video management server 200 may include a low-resolution image storage unit 210 and a low-resolution image analyzer 220.

The imaging device 100 may generate a first image by capturing a surveillance area at a first resolution. Surveillance area may include an area to be monitored by the video management system 10 or an area where information is to be obtained. The surveillance area may be an area around the imaging device 100 including a position where the imaging device 100 is installed, or an area not including the position where the imaging device 100 is installed.

In this case, the first resolution may be a high-resolution. For example, the first resolution may be a high definition (HD) resolution, a full HD (FHD) resolution, or a 4K resolution. Exemplary embodiments are not limited thereto, and the first resolution may be any of various resolutions that are higher than a second resolution described below.

The high-resolution image storage unit 110 may store the first image captured at the first resolution. Examples of the high-resolution image storage unit 110 may include, but are not limited to, a hard disk drive or a solid-state drive, and any of various magnetic storage media or flash storage media.

According to an exemplary embodiment, the image converter 120 may convert the first image into a second image having a second resolution that is lower than the first resolution. For example, when the first resolution is a 4K resolution, the second resolution may be a 640×480 resolution.

In this case, the video management system 10 may determine the second resolution based on channels that may be used to upload an image from the imaging device 100 to the video management server 200. For example, in order for the imaging device 100 to transmit an HD screen output to the video management server 200 in real time, a data rate of the video management server 200 may need to be equal to or greater than 2 Mbps. If a plurality of the imaging devices 100 are used to transmit images to one video management server 200 or if the imaging device 100 captures a plurality of images and transmits the plurality of images to the video management server 200, a higher data rate may be required. In order for the video management server 200 to have a higher data rate, costs for constructing the video management server 200 may be increased. Accordingly, the video management system 10 may determine a size of an image that the video management server 200 may receive without difficulty, considering the data rate of the video management server 200. The image converter 120 may determine a resolution corresponding to the determined size of the image as the second resolution.

The image transmitter 130 may transmit the second image to the video management server 200. The image transmitter 130 may transmit the second image to the video management server 200 at a time that is almost the same as the time when the imaging device 100 captures the first image. The image transmitter 130 may also transmit the second image to the video management server 200 with a time difference from the time when the imaging device 100 captures the first image.

The imaging device 100 may perform in parallel an operation of storing the first image and an operation of converting the first image into the second image and transmitting the second image. In detail, the imaging device 100 may need to continuously perform an operation of obtaining and storing the first image by capturing the surveillance area during a period determined by the video management system 10. Also, the imaging device 100 may also need to continuously perform an operation of converting the first image into the second image and transmitting the second image to the video management server 200. Accordingly, the imaging device 100 may perform a first process and a second process so that the first process for storing the first image in the high-resolution image storage unit 110 and the second process for converting the first image into the second image by the image converter 120 and transmitting the second image to the video management server 200 by the image transmitter 130 at least partially overlap each other.

The video management server 200 may receive the second image transmitted from the imaging device 100. The low-resolution image storage unit 210 may store the second image. Examples of the low-resolution image storage unit 210 may include, but are not limited to, a hard disk drive or a solid-state drive, and any of various magnetic storage media or flash storage media.

The low-resolution image analyzer 220 may generate low-resolution image metadata and an index of the low-resolution image metadata by analyzing the second image. Low-resolution image metadata may include data that may provide additional information about the second image.

For example, when the low-resolution image analyzer 220 analyzes the second image and determines that a person appears in the second image 2 minutes and 30 seconds, 4 minutes, and 7 minutes and 40 seconds after the second image starts, the low-resolution image analyzer 220 may include, in the low-resolution image metadata, information indicating that scenes where the person appears exist in the above time periods.

Alternatively, when the low-resolution image analyzer 220 analyzes the second image and determines that a sound exceeding a predetermined decibel is produced 2 minutes and 40 seconds and 5 minutes after the second image starts, the low-resolution image analyzer 220 may include, in the low-resolution image metadata, information indicating that scenes where the sound exceeding the predetermined decibel is produced exist in the above time periods.

Also, the low-resolution image analyzer 220 may generate metadata related to various information that may be obtained by analyzing an image, for example, a point in time when a person appears in the image, features of the person such as clothes or gender, whether the person is registered in the video management system 10, a point in time when an object appears, a type of the object, a point in time when a sound is produced, or a type or a level of the sound, and may include the metadata in the low-resolution image metadata.

The low-resolution image analyzer 220 may analyze the second image by classifying objects in an image by using a machine learning algorithm. The low-resolution image analyzer 220 may analyze the second image, may extract various information included in the second image, and may include, in the metadata, the information or additional information (e.g., a time when each information appears, a frequency of appearance, or an average number of appearances per unit time) obtained from the information.

The low-resolution image analyzer 220 may generate an index of the low-resolution image metadata. Index may be a list or a value generated in order to easily search for a desired item in the second image or the low-resolution image metadata. That is, when the external device 300 requests the video management server 200 to provide the second image or information related to the second image, a user of the external device 300 may check an image or information at a desired point in time by referring to the low-resolution image metadata or the index of the low-resolution image metadata provided by the video management server 200.

The video management server 200 may transmit, to the imaging device 100, at least a part of the low-resolution image metadata and at least a part of the index of the low-resolution image metadata. In this case, the imaging device 100 may store the at least part of the low-resolution image metadata and the at least part of the index of the low-resolution image metadata so that the at least part of the low-resolution image metadata and the at least part of the index of the low-resolution image metadata correspond to the first image. In detail, the low-resolution image metadata may be data obtained based on the second image, and the second image may be an image obtained by converting a resolution of the first image. For example, the low-resolution image metadata may be data representing person information, object information, or sound information included in the first image. Accordingly, the imaging device 100 may process and store the at least part of the low-resolution image metadata and the at least part of the index of the low-resolution image metadata so that the at least part of the low-resolution image metadata and the at least part of the index of the low-resolution image metadata represent information about the first image.

According to an exemplary embodiment, the image converter 120 may obtain the second image by removing a sound component from the first image. In this case, the video management server 200 receiving the second image may generate image metadata and an index by analyzing the second image based on only an image component without a sound component.

According to an exemplary embodiment, the image converter 120 may obtain the second image by converting the first resolution of the first image into the second resolution that is lower than the first resolution and removing a sound component. By removing the sound component from the first image, a size of the second image may be further reduced.

Figure 3:
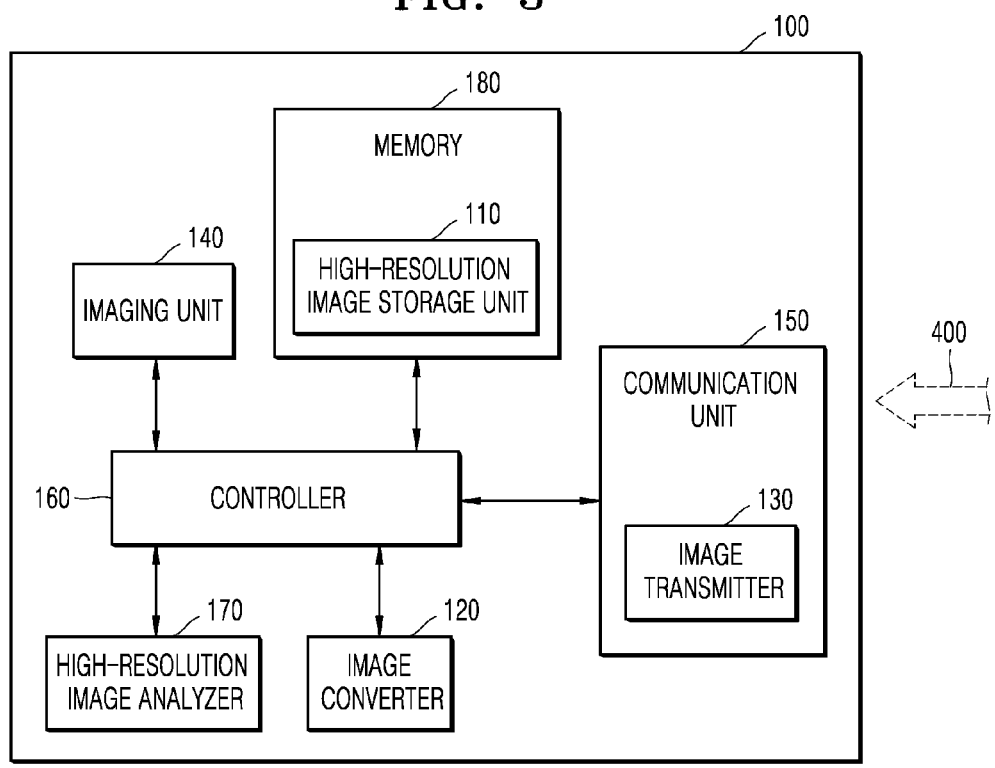
FIGS. 3 and 4 are block diagrams illustrating a configuration of an imaging device according to exemplary embodiments.
Figure 4:
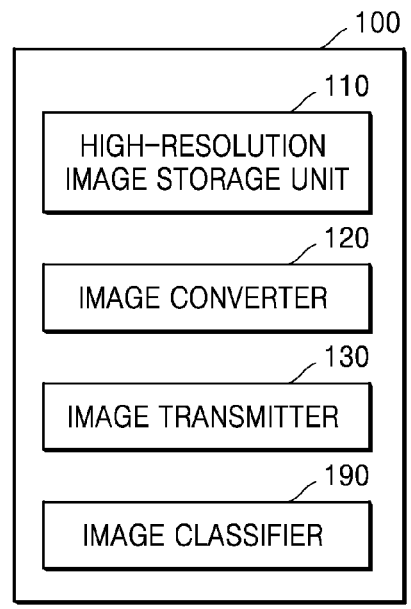

FIGS. 3 and 4 are block diagrams illustrating a configuration of the imaging device 100 according to exemplary embodiments.

Referring to FIG. 3, the imaging device 100 may further include an imaging unit 140, a communication unit 150, a controller 160, a high-resolution image analyzer 170, and/or a memory 180 in addition to the high-resolution image storage unit 110, the image converter 120, and the image transmitter 130.

The imaging device 100 may generate a first image by capturing a surveillance area at a first resolution by the imaging unit 140. The imaging unit 140 may include an optical unit and an image pickup unit.

The optical unit may include one or more lenses. The lenses may be various types of lenses. For example, the lenses may include a wide-angle lens or a fisheye lens used to monitor a wide surveillance area, a zoom lens used to enlarge and closely monitor a certain part of the entire surveillance area, and a thermal lens or an infrared (IR) lens used when an illuminance of the surveillance area is low. The lenses are not limited thereto, and may include various types of lenses for performing various functions.

The image pickup unit may form an image by converting light or thermal information received by the optical unit into an electrical image signal.

The communication unit 150 may perform wired/wireless communication with other electronic devices including the video management server 200 and/or the external device 300 or may transmit/receive an electronic signal to/from the outside by wire or wireless communication. In this case, the communication unit 150 may include the image transmitter 130. Examples of the communication unit 150 may include, but are not limited to, a Bluetooth communication unit, a Bluetooth low energy (BLE) communication unit, a near-field communication (NFC) unit, a wireless local area network (WLAN) communication unit (e.g., a Wi-Fi communication unit), a ZigBee communication unit, an infrared data association (IrDA) communication unit, a Wi-Fi Direct (WFD) communication unit, a ultra-wideband (UWB) communication unit, and an ANT+ communication unit.

The controller 160 may include a processor configured to control all operations of the imaging device 100. For example, the controller 160 may control the communication unit 150 to transmit or receive an image to/from the outside. The controller 160 may control the image converter 120 to convert the first image into a second image.

The controller 160 may include any device capable of processing data such as a processor. Processor may include, for example, a data processing device embedded in hardware and having a circuit physically structured to execute, for example, code or commands included in a program. As such, examples of the data processing device embedded in hardware may include, but are not limited to, a microprocessor, a central processing unit (CPU), a processor core, a multiprocessor, an application-specific integrated circuit (ASIC), and a field programmable gate array (FPGA).

The high-resolution image analyzer 170 may generate high-resolution image metadata and an index of the high-resolution image metadata by analyzing the first image. High-resolution image metadata may include data that may provide additional information about the first image. The description of low-resolution image metadata, an index of the low-resolution image metadata, and a relationship between the low-resolution image metadata and the second image may apply to the high-resolution image metadata, the index of the high-resolution image metadata, and a relationship between the high-resolution image metadata and the image data.

When obtaining the high-resolution image metadata by analyzing the first image, the high-resolution image analyzer 170 may obtain only information that may not be obtained by analyzing the second image. For example, information about a point in time when a person or an object appears in the first image or the second image or a point in time when a sound equal to or higher than a predetermined decibel is produced may be obtained by analyzing the first image but may not be obtained by analyzing the second image. Accordingly, in order to reduce or prevent repeated analyses, the high-resolution image analyzer 170 may not perform analysis that may be performed by the low-resolution image analyzer 220. For example, a brand mark displayed on clothes of a person appearing in the first image or the second image may be clearly identified in the first image that is a high-resolution image but may not be identified or may be difficult to identify in the second image that is a low-resolution image. As a result, the brand mark may not be identified by the low-resolution image analyzer 220. The high-resolution image analyzer 170 may identify the brand mark and may include information about the brand mark in the high-resolution image metadata.

According to an exemplary embodiment, the second image may be obtained by removing a sound component from the first image. In this case, the high-resolution image analyzer 170 may obtain the high-resolution image metadata by analyzing the sound component of the first image. Also, the high-resolution image analyzer 170 may not perform image-based analysis that may be performed by the low-resolution image analyzer 220.

According to an exemplary embodiment, the second image may be obtained by reducing a resolution of the first image and removing a sound component. In this case, the high-resolution image analyzer 170 may obtain the high-resolution image metadata based on the sound component of the first image, and may obtain the high-resolution image metadata according to a result of high-resolution image-based analysis of the first image.

The memory 180 may temporarily or permanently store data processed by the imaging device 100. Examples of the memory 180 may include, but are not limited to, a hard disk drive or a solid-state drive, and any of various magnetic storage media or flash storage media.

The memory 180 may include the high-resolution image storage unit 110. The high-resolution image metadata and the index of the high-resolution image metadata obtained by analyzing the first image may be stored in the high-resolution image storage unit 110 or may be stored in the memory 180.

The imaging device 100 may transmit at least a part of the high-resolution image metadata and at least a part of the index of the high-resolution image metadata to the video management server 200 through the communication unit 150. The video management server 200 may store the at least part of the high-resolution image metadata and the at least part of the index of the high-resolution image metadata so that the at least part of the high-resolution image metadata and the at least part of the index of the high-resolution image metadata correspond to the second image. That is, since the high-resolution image metadata is data obtained from the first image and the second image is generated from the first image, although specific information indicated by the high-resolution image metadata may not be included in the second image, the video management server 200 may determine whether the specific information indicated by the high-resolution image metadata exists in the first image corresponding to a certain point in time of the second image. The video management server 200 may store the at least part of the high-resolution image metadata and the index of the high-resolution image metadata.

In this case, the low-resolution image analyzer 220 of the video management server 200 may generate low-resolution image metadata by including only data other than information included in the high-resolution image metadata, from among metadata that may be obtained by analyzing the second image. Accordingly, the video management system 10 may more efficiently use a storage space by causing the high-resolution image metadata and the low-resolution image metadata not to include redundant information. Alternatively, regardless of whether information is included in the high-resolution image metadata, the low-resolution image analyzer 220 may generate the low-resolution image metadata by including all information that may be obtained by analyzing the second image.

Also, the video management server 200 may store only low-resolution image metadata other than data included in the high-resolution image metadata from among the low-resolution image metadata. The video management system 10 may more efficiently use a storage space.

Also, the high-resolution image analyzer 170 of the imaging device 100 may generate the high-resolution image metadata by including only metadata indicating information that is included in the first image and is not included in the second image, from among metadata that may be obtained by analyzing the first image. When the external device 300 requests the video management server 200 to provide content related to information also included in the second image, the video management server 200 may directly provide the content. That is, metadata indicating information included in the second image does not need to be repeatedly analyzed by the imaging device 100. Accordingly, the imaging device 100 may more efficiently use a CPU by generating the high-resolution image metadata by including only metadata indicating information that is included in the first image and is not included in the second image and not analyzing redundant information, and may more efficiently use a storage space by not storing the redundant information.

Also, the imaging device 100 may store, in the memory 180, only high-resolution image metadata indicating information that is included in the first image and is not included in the second image from among the high-resolution image metadata. The video management system 10 may more efficiently use a storage space.

Referring to FIG. 4, the imaging device 100 may further include an image classifier 190 in addition to the high-resolution image storage unit 110, the image converter 120, and the image transmitter 130.

The image classifier 190 may analyze a first image and may classify the first image into a transmission-required image needed to be transmitted to the video management server 200 and a transmission-unrequired image not needed to be transmitted to the video management server 200. In detail, even when the first image is compressed into a second image and the second image is transmitted, the transmission of an image that does not include certain information may lead to less efficient use of a wired/wireless communication network or a storage space of the video management server 200. Accordingly, the image classifier 190 may classify an image into a transmission-required image and a transmission-unrequired image according to a predetermined criterion (e.g., whether a preset person or object appears in the image, whether a sound equal to or higher than a preset decibel is produced, or a preset event occurs in the image). The image converter 120 may generate the second image by compressing only the transmission-required image.

According to an exemplary embodiment, the first image that is a high-resolution image may be cumulatively stored in the memory 180. However, since there is a limitation in a storage capacity of the memory 180, when a remaining storage capacity of the memory 180 is less than a threshold value, the imaging device 100 may perform overwriting by writing a new image on top of existing images. In this process, the image classifier 190 may select a backup image to be transmitted to the video management server 200, from among the existing images to be overwritten, that is, the existing images stored in the memory 180 and expected to be deleted.

According to an exemplary embodiment, the image classifier 190 may select an image whose high-resolution version has been provided to an external device, for example, a user device, from among the existing images expected to be deleted, as a backup image. According to an exemplary embodiment, the image classifier 190 may select a backup image by referring to low-resolution metadata corresponding to the existing images expected to be erased. For example, the image classifier 190 may select a backup image by referring to event information, a user search history, or a history of transmission to the external device included in the low-resolution metadata corresponding to the existing images expected to be deleted.

A machine learning algorithm may be used in a process of selecting a backup image, and an operation of directly selecting a backup image by a user to learn the selection process may be performed several times. The image classifier 190 may learn the machine learning algorithm by referring to data (e.g., low-resolution metadata, a user search history, or a history of transmission to the external device) corresponding to the backup image selected by the user. The image classifier 190 may select a backup image based on data corresponding to the existing images expected to be erased according to the machine learning algorithm.

The image transmitter 130 may transmit an image selected as the backup image to the video management server 200.

Figure 5:
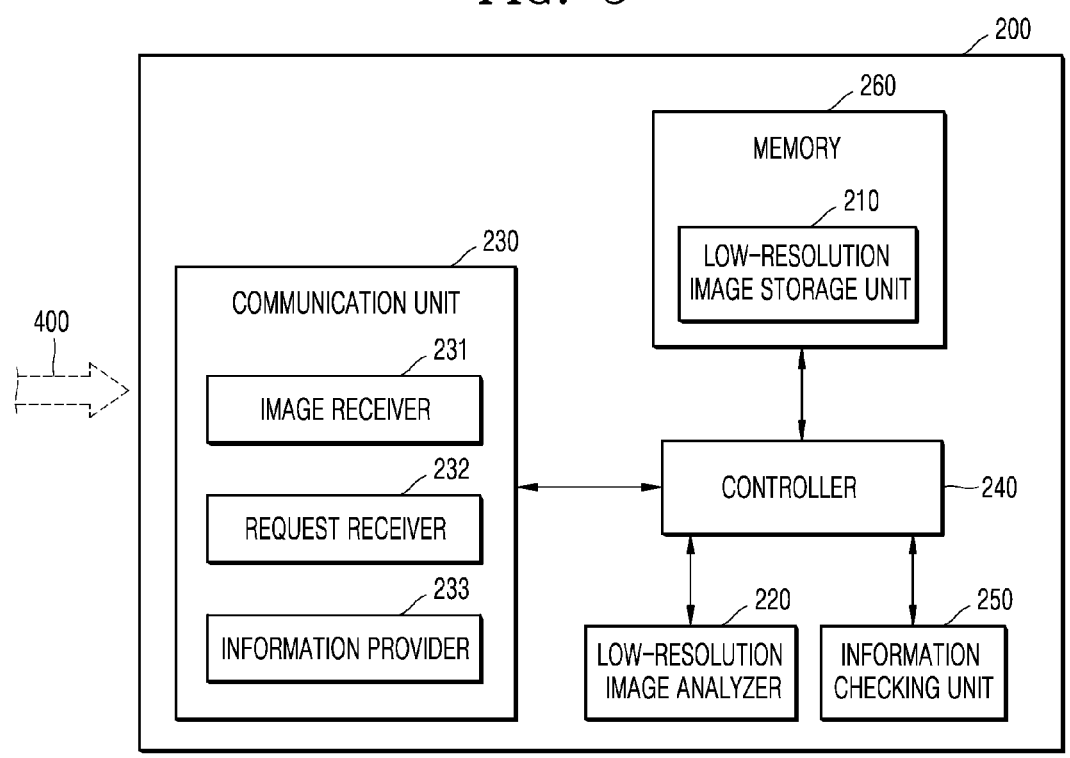
FIG. 5 is a block diagram illustrating a configuration of a video management server according to an exemplary embodiment.

FIG. 5 is a block diagram illustrating a configuration of the video management server 200 according to an exemplary embodiment.

Referring to FIG. 5, the video management server 200 may further include a communication unit 230, an image receiver 231, a request receiver 232, an information provider 233, a controller 240, an information checking unit 250, and a memory 260 in addition to the low-resolution image storage unit 210 and the low-resolution image analyzer 220.

The communication unit 230 may allow the video management server 200 to perform wired/wireless communication with other electronic devices including the imaging device 100 and/or the external device 300, and to transmit/receive an electronic signal to/from the outside by wire or wireless communication. The communication unit 230 may include the image transmitter 130. Examples of the communication unit 230 may include, but are not limited to, a Bluetooth communication unit, a BLE communication unit, an NFC unit, a WLAN communication unit (e.g., a Wi-Fi communication unit), a ZigBee communication unit, an IrDA communication unit, a WFD communication unit, a UWB communication unit, and an ANT+ communication unit.

The communication unit 230 may include the image receiver 231, the request receiver 232, and/or the information provider 233.

The image receiver 231 may receive a second image transmitted from the imaging device 100.

The request receiver 232 may receive the second image from the imaging device 100 or an information request signal requesting information related to the second image from the external device 300.

The information provider 233 may provide a whole or a part of the second image, low-resolution image metadata, and/or an index of the low-resolution image metadata to the external device 300 in response to the received information request signal.

The controller 240 may include a processor configured to control all operations of the video management server 200. The controller 240 may include any type of device capable of processing data such as a processor. The processor may include, for example, a data processing device embedded in hardware and having a circuit physically structured to execute code or commands included in a program. As such, examples of the data processing device embedded in hardware may include, but are not limited to, a microprocessor, a CPU, a processor core, a multiprocessor, an ASIC, and an FPGA.

The video management server 200 may further include the information checking unit 250 configured to determine whether information corresponding to the information request signal is included in the second image.

For example, when the video management server 200 receives an information request signal to check a point in time when, for example, a bicycle appears in the second image from the external device 300, whether a specific object appears in an image and whether the specific object is a bicycle may be determined by using the second image that is a relatively low-resolution image. In this case, the information checking unit 250 may determine whether information corresponding to the information request signal is included in the second image.

Alternatively, when the video management server 200 receives an information request signal to check, for example, a brand of a bicycle appearing in the second image from the external device 300, although whether a bicycle appears may be determined by using the second image, it may be difficult to check a brand of the bicycle by using the second image that is a relatively low-resolution image. In this case, the information checking unit 250 may not determine whether information corresponding to the information request signal is not included in the second image.

When it is determined that information corresponding to the information request signal is not included in the second image, the information checking unit 250 may determine whether the information corresponding to the information request signal is included in the first image. In this case, an information request signal to determine whether the information corresponding to the information request signal is included in the first image may be transmitted to the imaging device 100. Next, the video management server 200 may receive a response signal to the information request signal and may determine whether the information corresponding to the information request signal is included in the first image.

When it is determined that the information corresponding to the information request signal is not included in the second image and is included in the first image, the video management server 200 may transmit, to the imaging device 100, a transmission signal for providing at least one from among the entire first image, a part of the first image, and/or information obtained by analyzing the first image to the external device 300. The imaging device 100 may provide information requested by the external device 300 to the external device 300 in response to the transmission signal. The transmission signal may be transmitted to the imaging device 100 by the information checking unit 250 of the video management server 200.

Figure 6:
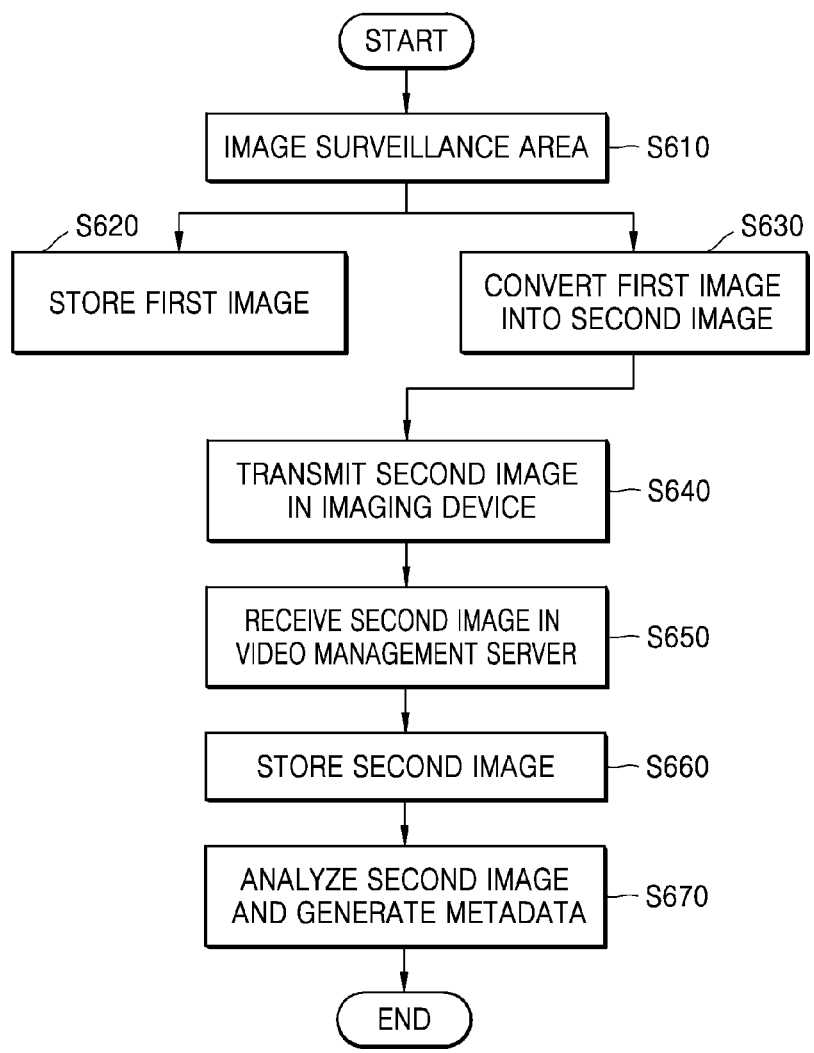
FIGS. 6 through 8 are flowcharts of a video management method according to exemplary embodiments.
Figure 7:
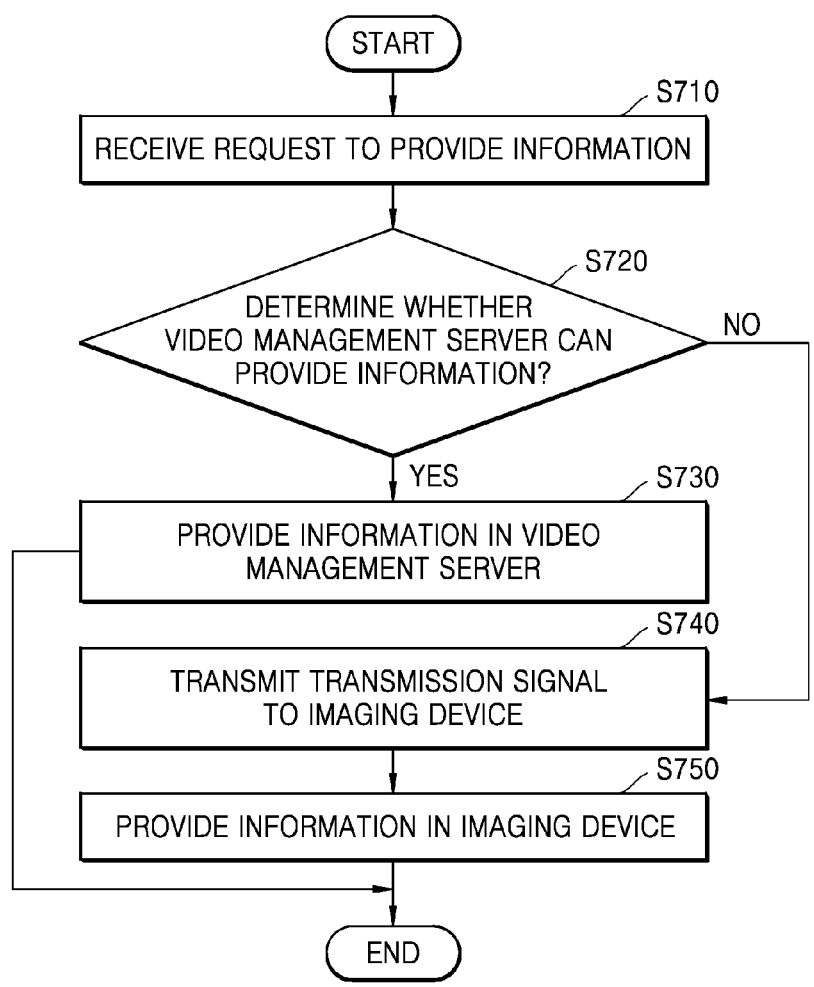
Figure 8:
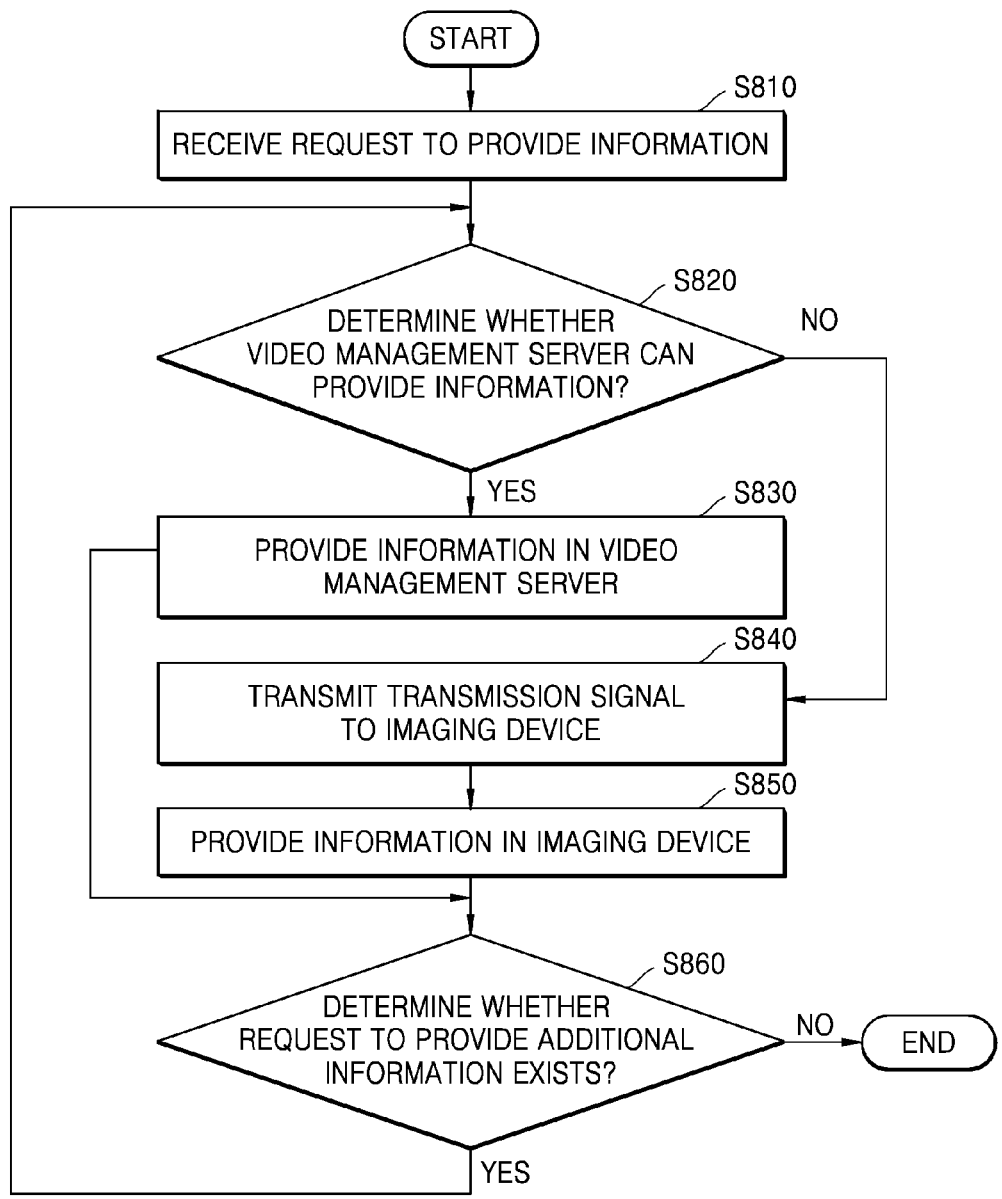

FIGS. 6 through 8 are flowcharts for explaining a video management method according to exemplary embodiments.

Referring to FIG. 6, the video management method according to an exemplary embodiment may be performed by the imaging device 100 and the video management server 200.

First, in operation S610, the imaging device 100 may capture a surveillance area. In this case, the imaging device 100 may generate a first image by capturing the surveillance area at a first resolution. Next, in operation S620, the imaging device 100 may store the first image. Operation S620 may be performed by the high-resolution image storage unit 110 of the imaging device 100. Also, in operation S630, the imaging device 100 may convert the first image into a second image. In this case, the second image may be an image having a second resolution that is lower than the first resolution. Operation S630 may be performed by the image converter 120 of the imaging device 100. Operations S620 and S630 may be performed so that operations S620 and S630 at least partially overlap each other.

Next, in operation S640, the imaging device 100 may transmit the second image to the video management server 200. Next, in operation S650, the video management server 200 may receive the second image. Next, in operation S660, the video management server 200 may store the second image. Next, in operation S670, the video management server 200 may generate low-resolution image metadata and/or an index of the low-resolution image metadata by analyzing the second image.

Referring to FIG. 7, the video management method according to an exemplary embodiment may be performed by the imaging device 100 and the video management server 200. The video management method of FIG. 7 may be performed after the first image and the second image are generated and are respectively stored in the imaging device 100 and the video management server 200 by the video management method of FIG. 6.

First, in operation S710, the video management server 200 may receive an information request signal from the external device 300.

Next, in operation S720, the video management server 200 may determine whether information corresponding to the information request signal may be provided to the external device 300 by using only the second image, low-resolution image metadata, and/or an index of the low-resolution image metadata stored in the video management server 200.

When it is determined in operation S720 that the information corresponding to the information request signal may be provided to the external device 300 by using only information stored in the video management server 200, the video management method may proceed to operation S730. In operation S730, the video management server 200 may provide the information to the external device 300.

When it is determined in operation S720 that the information corresponding to the information request signal may not be provided to the external device 300 by using only the information stored in the video management server 200, the video management method may proceed to operation S740.

In operation S740, the video management server 200 may transmit a transmission signal including content of the information request signal to the imaging device 100. In this case, in operation S750, the imaging device 100 may check the transmission signal and may transmit the information corresponding to the information request signal to the external device 300.

Referring to FIG. 8, an operation of providing information to the external device 300 through the imaging device 100 and/or the video management server 200 may be repeatedly performed. That is, like in the method of FIG. 7, in operation S810, the video management server 200 may receive an information request signal, in operation S820, it may be determined whether information may be provided only through the video management server 200, in operation S830, when it is determined that the information may be provided, the video management server 200 may provide the information, in operation S840, when it is determined that the information may not be provided only through the video management server 200, a transmission signal may be transmitted to the imaging device 100, and in operation S850, the imaging device may provide the information. After the information is completely provided in operation S830 or S850, in operation S860, it may be determined whether the video management system 10 receives a request to provide additional information. That is, while checking an image, a user of the external device 300 may transmit a request to the video management server 200 to provide information related to the image several times. In this case, when an additional information request is received, the video management system 10 may return to operation S820 and may determine whether information may be provided only through the video management server 200 or information of the first image stored in the imaging device 100 is required. Operation S860 may be performed by the video management server 200.

When the video management system 10 is used, since the imaging device 100 does not need to analyze detailed content of an image, the imaging device 100 may not need to perform relatively complex intelligent image analysis and costs of the imaging device 100 may not be increased. Also, since only the second image that is a relatively low-resolution image is uploaded from the imaging device 100 to the video management server 200, the burden on the video management server 200 that receives an image may be reduced. Also, since the user of the external device 300 may obtain information that may be obtained by using only the second image that is a low-resolution image through the video management server 200 and when the first image is required, may receive the first image from the imaging device 100, an effect similar to that obtained when the imaging device 100 or the video management server 200 directly analyzes a high-resolution image may be achieved.

According to the exemplary embodiments, there may be provided a video management system and a video management method that may allow an imaging device to capture a high-resolution image, and simultaneously store the high-resolution image and transmit a low-resolution image converted from the high-resolution image to a video management server.

Also, according to the exemplary embodiments, there may be provided a video management system and a video management method that may allow a video management server to analyze a low-resolution image, provide the low-resolution image and an analysis result according to a request of an external device, and when receiving a request to provide information related to a high-resolution image from the external device, provide the information through an imaging device.

While the present disclosure has been shown and described with reference to exemplary embodiments thereof, they are provided for the purposes of illustration. It will be understood by one of ordinary skill in the art that various modifications and equivalent embodiments may be made without departing from the principles and technical spirit of the present disclosure as defined by the appended claims, and their equivalents.

What is claimed is:

1. A video management system comprising:
   an imaging device configured to generate a first image at a first resolution; and
   a video management server configured to store a second image obtained by converting the first image,
   wherein the imaging device comprises:
   a high-resolution image storage configured to store the first image;
   a processor configured to:
      convert the first image into the second image having a second resolution that is lower than the first resolution; and
      transmit the second image to the video management server, and
   wherein the video management server comprises:
   a low-resolution image storage configured to store the second image; and
   a processor configured to generate low-resolution image metadata and an index of the low-resolution image metadata by analyzing the second image,
   wherein the processor of the video management server is further configured to:
      receive, from an external device, an information request signal;
      determine whether information corresponding to the information request signal is included in the second image; and
      determine whether the information corresponding to the information request signal is included in the first image when it is determined that the information corresponding to the information request signal is not included in the second image.

2. The video management system of claim 1, wherein the processor of the video management server is further configured to:
   provide, to the external device, information comprising at least one from among the second image, a portion of the second image, the low-resolution image metadata, and the index of the low-resolution image metadata when it is determined that the information corresponding to the information request signal is included in the second image.

3. The video management system of claim 2, wherein, when it is determined that the first image is required to provide the information corresponding to the information request signal, the video management server is further configured to transmit, to the imaging device, a transmission signal to provide information comprising at least one from among the first image, a portion of the first image, and information obtained by analyzing the first image to the external device.

4. The video management system of claim 3, wherein the imaging device is further configured to transmit information corresponding to the transmission signal to the external device in response to receiving the transmission signal.

5. The video management system of claim 1, wherein the imaging device is further configured to generate high-resolution image metadata and an index of the high-resolution image metadata by analyzing the first image.

6. The video management system of claim 5, wherein the imaging device is further configured to transmit, to the video management server, at least a part of the high-resolution image metadata and at least a part of the index of the high-resolution image metadata, and
wherein the video management server is further configured to store the at least part of the high-resolution image metadata and the at least part of the index of the high-resolution image metadata.

7. The video management system of claim 6, wherein the processor of the imaging device is further configured to generate the low-resolution image metadata comprising only metadata not included in the high-resolution image metadata, from among metadata corresponding to the second image.

8. The video management system of claim 5, wherein the processor of the imaging device is further configured to generate the high-resolution image metadata comprising only metadata corresponding to information that is included in the first image and is not included in the second image, from among metadata corresponding to the first image.

9. The video management system of claim 5, wherein the imaging device is further configured to store only high-resolution image metadata corresponding to information that is included in the first image and is not included in the second image, from among the high-resolution image metadata.

10. The video management system of claim 1, wherein the video management server is further configured to transmit, to the imaging device, at least a part of the low-resolution image metadata and at least a part of the index of the low-resolution image metadata, and
wherein the imaging device is further configured to store the at least part of the low-resolution image metadata and the at least part of the index of the low-resolution image metadata.

11. The video management system of claim 1, wherein the processor of the imaging device is further configured to classify the first image into a transmission-required image required to be transmitted to the video management server and a transmission-unrequired image not required to be transmitted to the video management server by analyzing the first image based on a predetermined criterion, and
wherein the processor of the imaging device is further configured to generate the second image by converting the transmission-required image.

12. The video management system of claim 11, wherein the predetermined criterion comprises whether a preset person or object appears in the first image, whether a sound equal to or higher than a preset decibel is produced in the first image, and a preset event occurs in the first image.

13. The video management system of claim 1, wherein the processor of the imaging device is further configured to obtain the second image by converting the first resolution of the first image into the second resolution that is lower than the first resolution, and by removing a sound component from the first image.

14. A video management system comprising:
an imaging device configured to generate a first image at a first resolution; and
a video management server configured to store a second image obtained by converting the first image,
wherein the imaging device comprises:
a high-resolution image storage configured to store the first image;
a processor configured to:
convert the first image into the second image having a second resolution that is lower than the first resolution; and
transmit the second image to the video management server, and
wherein the video management server comprises:
a low-resolution image storage configured to store the second image; and
a processor configured to generate low-resolution image metadata and an index of the low-resolution image metadata by analyzing the second image,
wherein the imaging device performs:
a first process for storing the first image in the high-resolution image storage; and
a second process for converting the first image into the second image and transmitting the second image to the video management server by the processor of the imaging device, and
wherein the first process and the second process at least partially overlap each other,
wherein the processor of the video management server is further configured to:
receive, from an external device, an information request signal;
determine whether information corresponding to the information request signal is included in the second image; and
determine whether the information corresponding to the information request signal is included in the first image when it is determined that the information corresponding to the information request signal is not included in the second image.

15. The video management system of claim 14, wherein the low-resolution image metadata comprises at least one of a point in time when a person appears in the second image, a point in time when an object appears in the second image, a type of the object, a point in time when a sound is produced, and a type of the sound.

16. A video management method of managing a captured image by using a video management system comprising an imaging device and a video management server, the video management method comprising:
generating, by the imaging device, a first image at a first resolution;
storing, by the imaging device, the first image;
converting, by the imaging device, the first image into a second image having a second resolution that is lower than the first resolution;
transmitting, by the imaging device, the second image to the video management server;
storing, by the video management server, the second image;
generating, by the video management server, low-resolution image metadata and an index of the low-resolution image metadata by analyzing the second image;
receiving, by the video management server from an external device, a request to provide information;
determining, by the video management server, whether information corresponding to the request is included in the second image; and
determining, by the video management server, whether the information corresponding to the request is included in the first image when it is determined that the information corresponding to the request is not included in the second image.

17. The video management method of claim 16, further comprising:
transmitting, by the video management server to the imaging device, a transmission signal requesting the imaging device to provide the information corresponding to the request to the external device.

18. The video management method of claim 17, further comprising:
transmitting, by the video management server, the information corresponding to the request to the external device when it is determined that the information corresponding to the request is included in the second image; and
transmitting, by the imaging device, the information corresponding to the request to the external device in response to receiving the transmission signal.

19. A video management system comprising:
an imaging device configured to generate a first image at a first resolution; and
a video management server configured to store a second image obtained by converting the first image,
wherein the imaging device comprises:
a high-resolution image storage configured to store the first image;
a processor configure to:
convert the first image into the second image having a second resolution that is lower than the first resolution; and
transmit the second image to the video management server,
wherein the video management server comprises:
a low-resolution image storage configured to store the second image;
a processor configured to:
receive, from an external device, a request to provide information corresponding to the second image;
determine whether information corresponding to the request is included in the second image, and when the information corresponding to the request is not included in the second image, to transmit, to the imaging device, a transmission signal requesting the imaging device to provide the information corresponding to the request to the external device; and
provide the information corresponding to the request to the external device when the information corresponding to the request is included in the second image, and
wherein the imaging device is further configured to, in response to receiving the transmission signal, transmit information corresponding to the transmission signal to the external device.

* * * * *